US009118389B1

(12) United States Patent
Rakib (10) Patent No.: US 9,118,389 B1
(45) Date of Patent: *Aug. 25, 2015

(54) EFFICIENT BANDWIDTH UTILIZATION METHODS FOR CATV DOCSIS CHANNELS AND OTHER APPLICATIONS

(71) Applicant: Gainspeed Inc., Sunnyvale, CA (US)

(72) Inventor: Shlomo Selim Rakib, Saratoga, CA (US)

(73) Assignee: Gainspeed, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,890

(22) Filed: Jul. 3, 2014

Related U.S. Application Data

(63) Continuation of application No. 13/478,461, filed on May 23, 2012, now Pat. No. 8,773,965.

(60) Provisional application No. 61/622,132, filed on Apr. 10, 2012.

(51) Int. Cl.
| | | |
|---|---|---|
| *H04J 1/12* | (2006.01) | |
| *H04J 3/00* | (2006.01) | |
| *H04J 3/10* | (2006.01) | |
| *H04B 3/32* | (2006.01) | |
| *H04B 3/50* | (2006.01) | |

(52) U.S. Cl.
CPC .. *H04B 3/32* (2013.01); *H04B 3/50* (2013.01); *H04J 1/12* (2013.01); *H04J 3/10* (2013.01)

(58) Field of Classification Search
None
See application file for complete search history.

(56) References Cited

U.S. PATENT DOCUMENTS

| | | | |
|---|---|---|---|
| 7,050,419 B2 | 5/2006 | Azenkot et al. | |
| 7,139,283 B2 | 11/2006 | Quigley et al. | |
| 8,270,419 B2 | 9/2012 | Liva et al. | |
| 8,311,412 B2 | 11/2012 | Rakib | |
| 8,320,395 B2 * | 11/2012 | Pajukoski et al. | 370/431 |
| 8,397,267 B2 | 3/2013 | Chapman et al. | |
| 8,773,965 B2 | 7/2014 | Rakib | |
| 2002/0136203 A1 * | 9/2002 | Liva et al. | 370/352 |
| 2002/0136231 A1 * | 9/2002 | Leatherbury et al. | 370/442 |
| 2002/0154620 A1 | 10/2002 | Azenkot et al. | |

(Continued)

FOREIGN PATENT DOCUMENTS

| | | |
|---|---|---|
| WO | PCT/US2013/026558 | 4/2013 |
| WO | WO 2013/126298 | 8/2013 |

OTHER PUBLICATIONS

Portions of prosecution history of U.S. Appl. No. 13/478,461, May 28, 2014, Rakib, Shlomo Selim.

(Continued)

*Primary Examiner* — Candal Elpenord
(74) *Attorney, Agent, or Firm* — Adeli LLP (57) ABSTRACT

Methods to improve the data carrying capacity of CATV DOCSIS systems and other communications systems are disclosed. Communications channels may be more efficiently spaced with reduced or absent guard bands by using receivers with adaptive signal cancellation methods, equalizing circuits, or polyphase filter banks and Fast Fourier Transform signal processing methods to correct for higher levels of cross-talk. QAM type communications channels may also be utilized on a synchronized two-transmitter at a time basis by adjusting the transmitters to predefined signal levels, such as +1, −1, +½, −½ to enable the combined signals to be distinguished at the receiver. These two methods may be combined to create a still higher data throughput system.

17 Claims, 11 Drawing Sheets

(56) References Cited

U.S. PATENT DOCUMENTS

| | | | |
|---|---|---|---|
| 2003/0013453 A1* | 1/2003 | Lavaud et al. | 455/450 |
| 2003/0033611 A1* | 2/2003 | Shapiro et al. | 725/136 |
| 2005/0022247 A1 | 1/2005 | Bitran et al. | |
| 2005/0058082 A1 | 3/2005 | Moran, III et al. | |
| 2005/0175040 A1 | 8/2005 | Holborow | |
| 2006/0294540 A1 | 12/2006 | Perlman | |
| 2007/0032256 A1 | 2/2007 | Kolze | |
| 2007/0147226 A1 | 6/2007 | Khandekar et al. | |
| 2008/0062889 A1 | 3/2008 | Azenko et al. | |
| 2009/0016431 A1 | 1/2009 | Chen | |
| 2011/0052209 A1 | 3/2011 | Gupta et al. | |
| 2011/0135044 A1 | 6/2011 | Kolze et al. | |
| 2011/0211652 A1 | 9/2011 | Debbah et al. | |
| 2011/0274148 A1 | 11/2011 | Urban et al. | |
| 2013/0170528 A1* | 7/2013 | Pantelias et al. | 375/222 |

OTHER PUBLICATIONS

Harris, Fred, et al., "Digital Receivers and Transmitters Using Polyphase Filter Banks for Wireless Communications," IEEE Transactions on Microwave Theory and Techniques, 51(4), Apr. 2003, pp. 1395-1412.

* cited by examiner

Figure 1

Prior art channel spacing with guard bands

Invention's denser channel spacing without guard bands

EFFICIENT BANDWIDTH UTILIZATION METHODS FOR CATV DOCSIS CHANNELS AND OTHER APPLICATIONS

CROSS REFERENCE TO RELATED APPLICATIONS

This application is a continuation of U.S. patent application Ser. No. 13/478,461, now issued as U.S. Pat. No. 8,773,965, "EFFICIENT BANDWIDTH UTILIZATION METHODS FOR CATV DOCSIS CHANNELS AND OTHER APPLICATIONS", inventor Shlomo Selim Rakib, filed May 23, 2012; application Ser. No. 13/478,461, now issued as U.S. Pat. No. 8,773,965, in turn claimed the priority benefit of U.S. provisional application 61/622,132, entitled "EFFICIENT BANDWIDTH UTILIZATION METHODS FOR CATV DOCSIS CHANNELS AND OTHER APPLICATIONS", inventor Shlomo Selim Rakib, filed Apr. 10, 2012; the contents of both applications are incorporated herein by reference.

FIELD OF THE INVENTION

This application is in the field of wired and wireless communications methods.

DESCRIPTION OF THE RELATED ART

The Data Over Cable Service Interface Specification (DOCSIS) series of standards and protocols for transmitting large amounts of data over Cable TV systems is now in widespread use. This method, originally introduced in 1997 by CableLabs, enables cable TV systems, originally introduced in the 1940's and 1950's pre-Internet era for the purpose of carrying analog television signals to the home, to be re-purposed and extended to now have many additional Internet and digital communications uses as well.

In its current DOCSIS 3.0 specification, the DOCSIS standard now allows various CATV households to use their respective cable modems to receive downstream digital data from the CATV cable head and cable plant, as well as use their cable modems to transmit digital data back upstream from the various households back to the cable plant and cable head.

As the popularity of modern DOCSIS CATV methods have grown, and as more and more home users become accustomed to transmitting large amounts of data (e.g. though high definition webcams for video conferencing) as well as receiving large amounts of data, an increasing number of CATV users are bumping up against the limits of present CATV data transmission methods. The problem is particularly acute for upstream signals, because many household modem users must share a comparatively small amount of upstream CATV bandwidth.

As a result, there is a considerable amount of commercial interest in finding ways to further extend the data carrying capacity of present DOCSIS CATV protocols, systems, and methods, particularly with regards to upstream data transmissions.

Under present DOCSIS protocols and methods, upstream data transmission from the various household cable modems is confined to the 5 MHz to 42 MHz frequency regions (in the US). Under the DOCSIS requirements these various cable modems contain software frequency adjustable transmitters that can assign the modems various time and frequency slots for transmitting. However due to the necessity of maintaining adequate separation between DOCSIS channels, a fair amount of this limited 5-42 MHz upstream region is presently occupied by empty guard band frequencies. Under prior art methods, these guard band frequencies are needed to minimize cross-talk between adjacent DOCSIS channels, but otherwise are undesirable because they consume valuable bandwidth.

Under the DOCSIS protocols, each DOCSIS channel is transmitted using Quadrature Amplitude Modulation (QAM) modulated waveforms. These waveforms transmit symbols (usually between about 2-8 bits per symbol) by varying the phase angle and intensity of the QAM waveforms. For example, for downstream transmission, the DOCSIS 3.0 specification utilizes 64 level or 256 level QAM modulated waveforms. By contrast, for upstream data, the DOCSIS 3.0 specification generally utilizes 4, 8, 16, 32, or 64 level QAM signals. This translates into 2, 3, 4, 5, and 6 bits per QAM symbol respectively.

BRIEF SUMMARY OF THE INVENTION

Due to the historical development of the various DOCSIS specification, the technological constraints operating at the time tended to enforce the concept that there must be comparatively large guard bands between different DOCSIS frequency channels. Although an acceptable solution at the time, today's data needs now make it less and less acceptable to allocate scarce bandwidth to maintain such prior art guard bands.

The invention is based, in part, on the insight that recent advances in signal processing technology now make it both feasible and cost effective to employ more sophisticated signal processing schemes to reduce or eliminate such relatively large guard bands.

The invention is further based, in part, on the insight that due to the enormous capital investment in DOCSIS compliant systems, tens of millions or more of household cable modems and associated support equipment, methods that improve the efficiency of DOCSIS data transmission that are generally backward compatible with this huge capital investment in DOCSIS systems are of high commercial value.

The invention is further based, in part, on the insight that the tens of millions of household cable modems presently in use under the DOCSIS 2.0 and 3.0 specifications may have additional flexibility capability that that is not being fully utilized. In particular, due to the programmable nature of modern DOCSIS cable modem transmitters, these in-place DOCSIS cable modems can, in principle, if improved CATV cable plant and head side DOCSIS receivers are provided, be simply upgraded to transmit more data upstream by the transmission of the proper set of DOCSIS cable modem software commands.

The invention is further based, in part, on the insight that for these purposes, it is desirable to provide improved CATV cable plant and head side DOCSIS receivers that employ modern techniques in adaptive signal cancellation/signal separation and equalization technology. When such improved CATV cable plant and head side DOCSIS receivers are provided, and the proper transmitter setting commands are sent to even prior art DOCSIS cable modems, such as DOCSIS 3.0 cable modems, it becomes feasible to improve the data carrying capacity of DOCSIS downstream data transmissions at a relatively low cost, and on a relatively rapid implementation schedule. Here for example, once DOCSIS cable modem setting commands are transmitted to the various cable modems in a CATV neighborhood, these now reset cable modems can now transmit upstream using a greater number of now more closely spaced adjacent upstream channels. The improved DOCSIS receivers can in turn correct for cross-talk between these adjacent channels using such improved adaptive cancellation/signal separation/equalization methods.

The invention is also based, in part, on the insight that in addition to the previously discussed methodology, there is also a different, second methodology to improve DOCSIS upstream data carrying capacity as well. This second methodology is also based on providing improved CATV cable head and plant side DOCSIS receivers, and it also operates by transmitting an alternate set of CATV cable modem upstream transmitter commands to prior art cable modems, such as DOCSIS 3.0 cable modems.

In this different second methodology is based, in part, on the insight that changes in various DOCSIS QAM modulation schemes, in particular on the DOCSIS 3.0 upstream 8, 16, 32, or 64 level QAM data modulation methods, can also be made at the cable modem side by issuing various DOCSIS cable modem software commands. If improved DOCSIS cable plant or cable head side receivers are provided, it is possible to reconfigure prior art DOCSIS cable modems to now allow two different cable modems to transmit on the same upstream channel frequency, and at the same time, effectively providing a low-cost and rapidly implemented scheme to nearly double upstream data transmission rates.

This second methodology relies, in part, on the synchronous nature of prior art DOCSIS protocols, such as the DOCSIS 3.0 protocols. According to this aspect of the invention, two cable modems, for example, may be programmed or otherwise set to transmit upstream on the same channel at the same time. However to enable an improved DOCSIS cable plant or cable head end receiver to distinguish the two different cable modems, one cable modem, for example may be set to transmit with full intensity (e.g. transmit pluses of levels +1 and −1). By contrast, and again as an example, the other cable modem may be set to transmit with half (e.g. ½) intensity (e.g. transmit pluses of levels +½ and −½). As will be discussed in more detail in the QAM constellation discussion, the properties of QAM signals inherently provide sufficient information that an improved DOCSIS receiver can distinguish between the two different cable modem transmitters.

Thus, for example, an improved cable plant or cable head DOCSIS receiver capable of discriminating between the various combined signal levels (e.g. 1½, ½, −½, and −1½) may be used for this purpose.

The two different but related improvements: more channels through narrower channel separation, and transmitting two cable modems at a time through alternate QAM modulation methods, are each capable of operating independently. However in a preferred embodiment, because the two different methods both generally require upgraded DOCSIS cable plant or head end receivers, and because the two different methods both also operate by sending alternate types of cable modem transmitter adjustment commands to the various household cable modems on a particular neighborhood stretch of CATV cable, in a preferred embodiment, both methods may be enacted at the same time and in the same upgrade package.

In combination, the two methods, systems, and devices described herein can thus combine to create a synergistic improvement in DOCSIS data carrying capacity. Although throughout this specification, the example of use of these two methods for CATV DOCSIS applications, and particularly for upstream CATV DOCSIS signal carrying applications is used as a specific example, it should be understood that the various applications of the invention's methods apply to other types of both wire and wireless data transmission as well.

DETAILED DESCRIPTION OF THE INVENTION

Terminology: In modern telecommunications technology, communications signals are often transmitted as various digitally modulated waveforms. Typically the maximum symbol rate (symbols per second) of a communications channel is equal to a constant of proportionality "B" times the bandwidth of a channel (in Hz).

Here the maximum symbol rate is often denoted as Fs.

Thus $Fs$(symbols/second)=$B$*Bandwidth (in Hz).

If each symbol in turn carries "n" bits, then the bitrate of a communications channel, in bits per second is thus the same constant "B" times the number of bits per symbol "n" times the bandwidth of the channel.

Bitrate(bits/second)=$n$*$Fs$=$n$*$B$*Bandwidth (in Hz).

Conversely, the spectral efficiency of a channel is often denoted as bitrate/bandwidth, or essentially the constant "B" times the number of bits per symbol.

Spectral efficiency=Bitrate/Bandwidth=$B$*$n$

In communications technology discussions, often various communications data parameters are expressed in units of bits per second, and Hz. As a result, the constant of proportionality "B" is often a number equal to or close to 1. When "B: is 1 or close to 1, at least to a first approximation, the maximum symbol rate (symbols per second) of a communications channel is equal to the bandwidth of the channel (in Hz).

$$Fs(\text{symbols/second}) \approx \text{Bandwidth(Hz)}.$$

Standard terminology in communication engineering is a bit informal in this regard. Thus often communications engineers use the terms "symbol rate" (Fs) and bandwidth interchangeably, even though the units are in fact somewhat different (e.g. symbols per second vs. spectral spread in Hz). Although this specification will occasionally follow this standard communication engineering usage, and terminology conventions, it should be understood that those skilled in the field will understand that symbol rate and bandwidth are in fact related by a constant of proportionality "B". B may be a conversion factor with value 1, or a conversion factor with a value that is often less than 2, such as 1.8.

Roll-Off Rate Discussion:

In order to efficiently transmit signals in the form of digitally modulated waveforms, it is not feasible to transmit perfect square waves or spikes, such as Dirac delta pulses. Rather, due to various real world limitations, all transmitted signals end up being spread somewhat over the time domain by that particular communications channel's impulse or frequency response parameters. To minimize intersymbol interference (ISI) due to this real-world spreading, communications engineers instead transmit various types of shaped waveforms optimized to minimize ISI.

In particular, often these various ISI optimized waveforms are shaped and transmitted according to a raised-cosine filter. The edges of such raised-cosine filter type waveforms typically do not end abruptly, but rather roll off in a gradual manner. The shape and extent of this roll-off spreading can be set to a value that is most appropriate for that particular channel's time domain characteristics and frequency domain characteristics. These considerations are often referred to as a channel's Nyquest ISI criterion.

The net effect of these various considerations is that in real world communications channels, here again exemplified by DOCSIS CATV channels (particularly upstream channels), this signal roll-off can cause the signals from one communications channel to interfere (cause cross talk with) with the signals from another communications channel unless the channels are separated by guard bands. As previously discussed, however, these guard bands waste valuable communications spectrum. However to avoid interference, prior art tended to regard them as a necessary evil.

First Aspect: Improved Guard Band Methods

In one embodiment, the invention may be viewed as a method of improving the upstream data transmission rate of a DOCSIS CATV cable system. In this embodiment, this method will generally comprise providing an improved DOCSIS receiver capable of correcting for cross-talk between adjacent DOCSIS channels. The invention also calls for directing a plurality of DOCSIS cable modems to transmit upstream using a plurality of adjacent channel frequencies selected with reduced or absent guard bands.

For example, whereas the prior art DOCSIS guard band width would be on the order of $\alpha*Fs$, where Fs is the bandwidth of each said channels, and $\alpha$ is the roll-off factor of the bandwidth of each of said channels, according to the invention, this guard band might only be half of less of this value.

Indeed, when a plurality of channels, such as N channels, are being transmitted on adjacent channels (e.g. closely spaced with no other channels are between them), then the bandwidth of these guard bands can be reduced to zero or nearly zero. Thus neglecting edge effects, N such adjacent channels would occupy $N*Fs$ bandwidth. When including edge effects (i.e. the extreme two extreme boundaries of the N adjacent channels), then according to the invention, the N such adjacent channels would occupy $(N+\alpha)*Fs$ bandwidth.

Although normal DOCSIS cable modems transmit upstream with a substantially larger frequency separation (guard bands) between channels, even under the DOCSIS specification, the frequency and spacing of such transmitters is under software control. Thus the transmitters can be directed to retransmit at a non-standard and substantially closer frequency separation by transmitting various commands to these cable modems (such as appropriate DOCSIS Offset Frequency Adjust parameters), to set the relevant cable modems to transmit on the desired, more closely spaced, frequencies.

The invention's improved DOCSIS receiver will generally receive this plurality of adjacent channels over a plurality of channel frequencies; and correct for cross talk between these adjacent DOCSIS channels. As will be discussed, this can often be done by various adaptive signal cancellation/signal separation/signal equalization methods.

In particular, in some embodiments, such adaptive signal separation techniques may operate by partitioning the incoming closely spaced DOCSIS channel signals through a polyphase filter bank, and further processing the output from said polyphase filter bank using Fast Fourier Transform methods. This may be done through one or more Digital Signal Processors or other electronic signal processing techniques.

Examples

Figure 1:
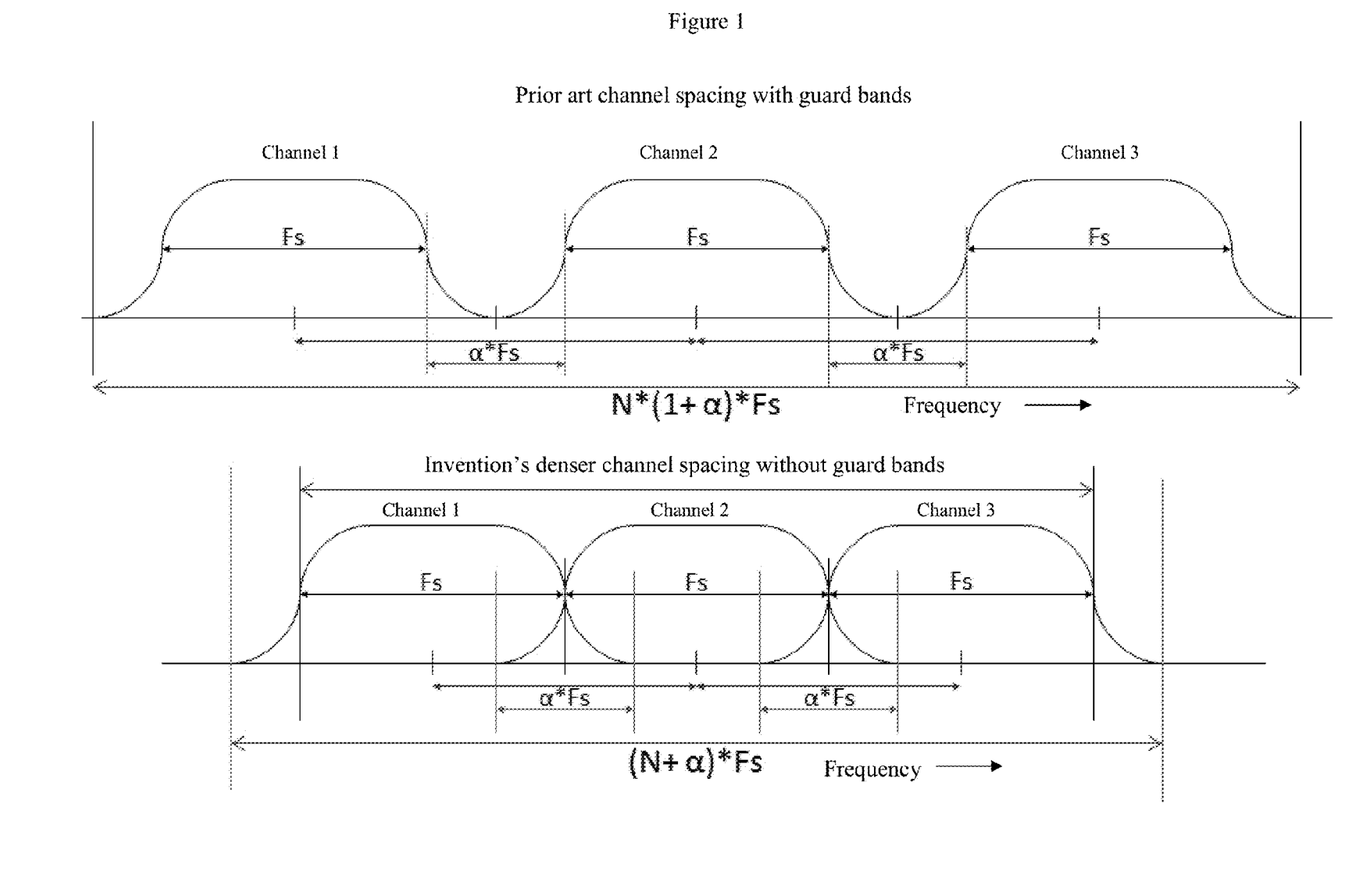
FIG. 1 shows a diagram of how the invention's Nyquist spaced transmitters can more densely pack multiple communications channels into available bandwidth.

As previously discussed, the DOCSIS specification calls for a guard band between different channels. As shown in FIG. 1 top, usually the edge of these DOCSIS channels tail off in intensity as a function of frequency according to a raised-cosine function (e.g. $\cos(\theta)^2$) with a roll-off factor $\alpha$. To prevent crosstalk, there will thus generally be guard bands between adjacent channels with at least a frequency spacing of $\alpha*Fs$, where, as previously discussed Fs, the bandwidth of the channel (when B=1), is proportional to the channel symbol transmission rate, and under the Nyquist rule is also proportional to the sampling rate (when the waveforms are sampled or digitized).

According to the invention, however, these guard bands of approximate bandwidth $\alpha*Fs$ can instead be reduced (e.g. to a substantially lower bandwidth such as one half $\alpha*Fs$ or less) or eliminated, and the various communication channels moved closer together.

If this is done, then for "N" communications channels, instead of the N communications channels taking at least $N*(1+\alpha)*Fs$ of valuable spectrum bandwidth (which is the minimum prior art value), instead according to the invention, now the N communications channels will take only $(N+\alpha)*Fs$ bandwidth. The excess spectrum bandwidth now released by this more efficient packing of N communication channels can then be used for other purposes, such as for additional downstream communications channels. The net effect is to cram additional downstream communications channels into the same bandwidth allocation, such as the 5-42 MHz (for the US) DOCSIS upstream region.

Here, as previously discussed, prior art DOCSIS cable modems, such as DOCSIS 3.0 cable modems, are capable of receiving DOCSIS commands that in turn program the cable modem transmitters to now to transmit with closer frequency spacing. Thus the problem is not on the transmitter side, the problem is on the CATV cable or head end receiver side. If the guard bands between the various DOCSIS upstream channels are reduced, and if prior art DOCSIS receivers are used, then the received upstream signals will be degraded due to crosstalk effects.

According to one aspect of the invention, this crosstalk problem can be resolved by using improved CATV cable or head end DOCSIS receivers that use adaptive canceling techniques, or equalization techniques, for improved signal separation to correct for this crosstalk.

One method to produce such improved receivers is to utilize conventional receivers, but also put in equalizer circuitry to correct for cross-talk.

Alternatively, in other embodiments, teaching similar to that of Harris et. al., "*Digital Receivers and Transmitters Using Polyphase Filter Banks for Wireless Communications*" *IEEE Transactions on Microwave Theory and Techniques Volume* 51(4), 1395-1412, (2003) may be used.

In this alternative scheme, the DOCSIS receivers needed to receive these more densely packed waveforms can operate using a combination of Fast Fourier Transform (FFT) methods and Polyphase filter methods. According to this Polyphase filter approach, the received frequency range is oversampled with a plurality of filters, and the received spectrum is then divided into many regions, such as M regions. This method has the advantage that it can be more easily implemented on modern and often inexpensive Digital Signal Processor (DSP) chips.

Figure 2A:
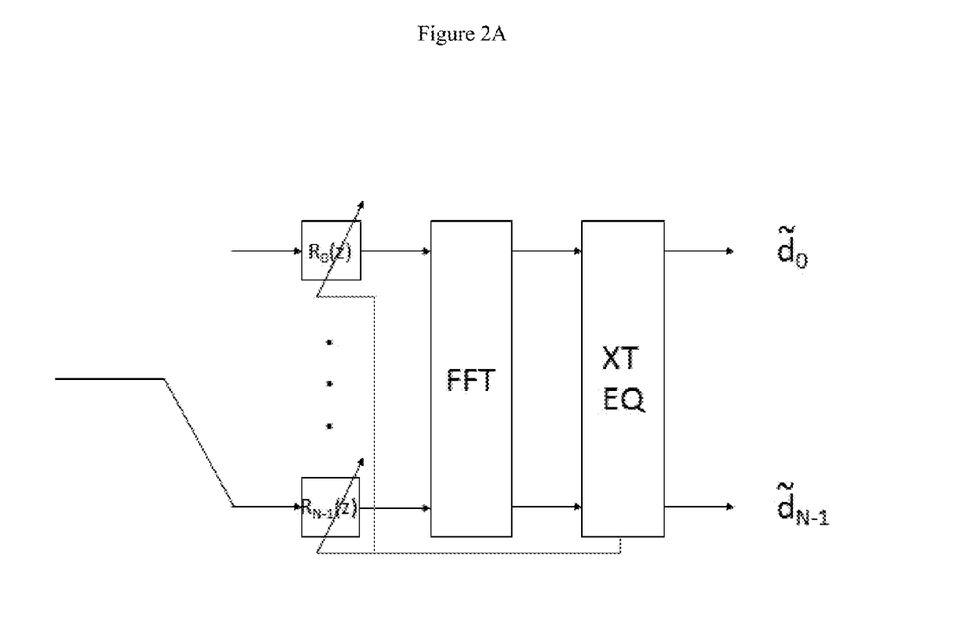
FIG. 2A shows an embodiment of a Nyquist spaced DOCSIS receiver

Other methods of cross talk correction are also possible. An example of such an improved DOCSIS receiver, which uses equalization techniques to correct for crosstalk between adjacent communications channels, is shown in FIG. 2A.

Figure 2B:
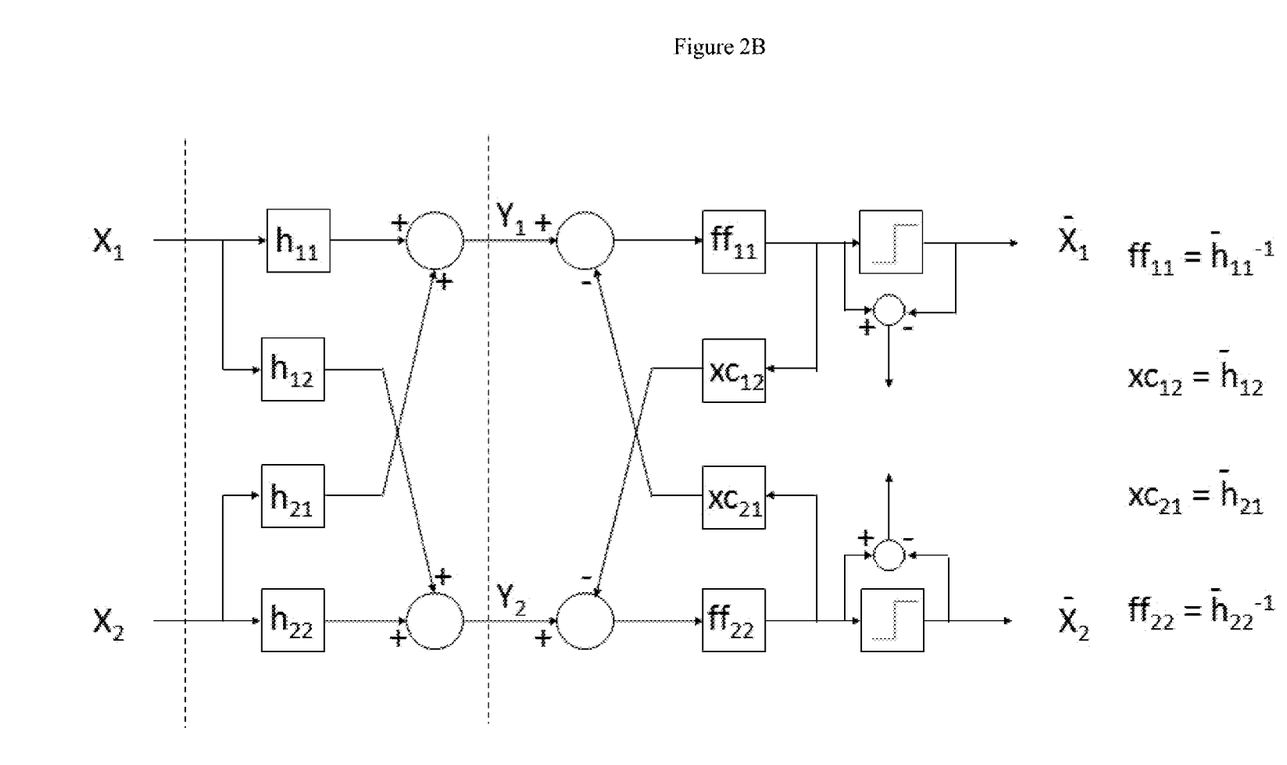
FIG. 2B shows more details of a feedback structure that can be used for correct for crosstalk between closely spaced channels.

FIG. 2B shows more details of a feedback structure that can be used for correct for crosstalk between closely spaced channels.

Figure 2C:
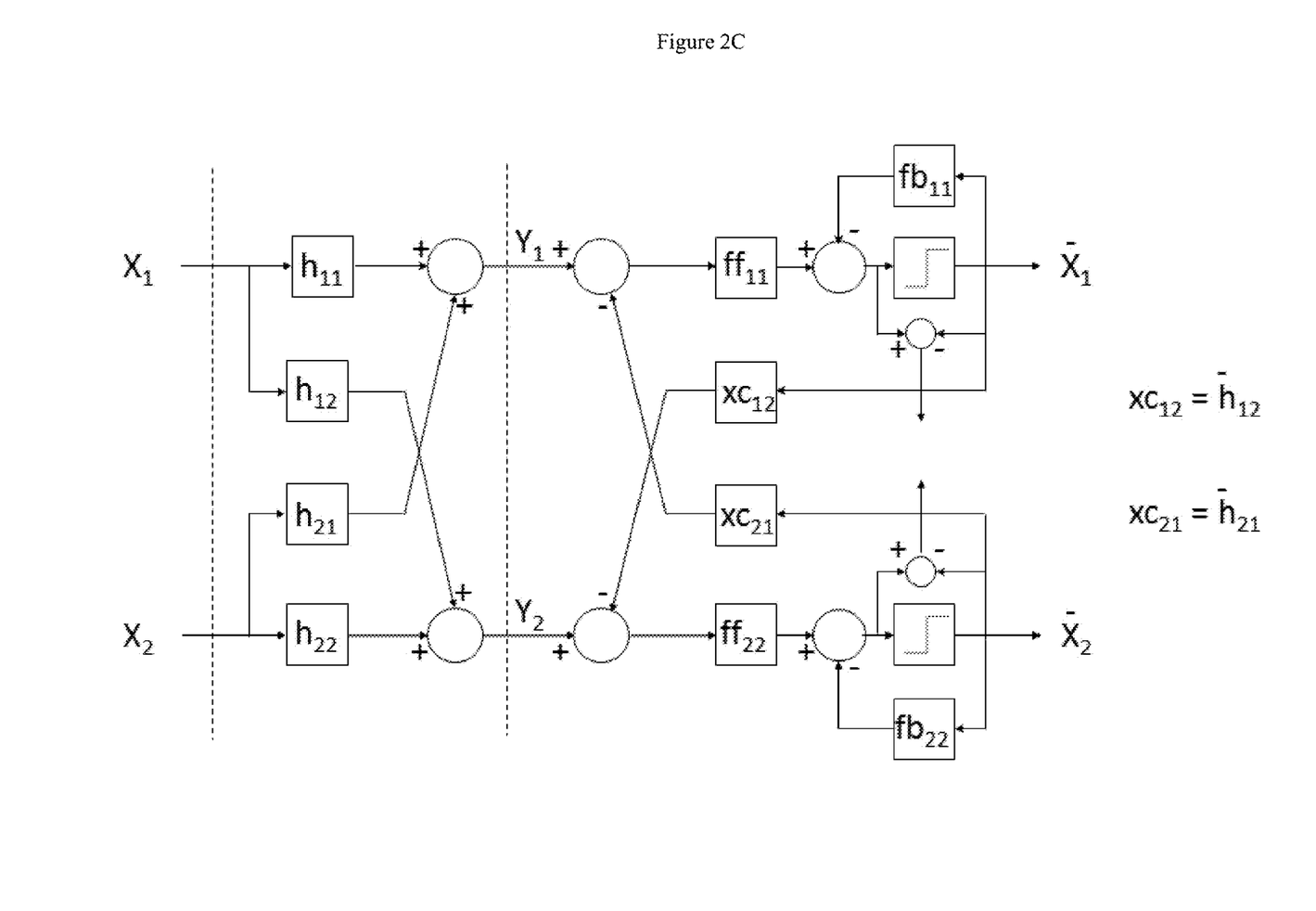
FIG. 2C shows a decision feedback structure that can be used to correct for crosstalk between closely spaced channels.

FIG. 2C shows a decision feedback structure that can be used to correct for crosstalk between closely spaced channels.

Note that although CATV DOCSIS channels, and in particular upstream channels, are used as a specific example of this aspect of the invention, this example is not intended to be limiting. This type of approach may also work for other applications, such as wireless cell phone channels, for example.

Thus from a commercial implementation perspective, by simply upgrading the DOCSIS receivers at various neighborhood CATV junctions, such as optical fiber junctions, and by programming the neighborhood cable modems to transmit with narrower frequency spacing, then, for example the upstream capability of an existing DOCSIS installation can be substantially upgraded at a relatively low cost.

Second Aspect: Packing More Bits into Each Communications Channel Through Fine Combined QAM Constellation Processing Background: The DOCSIS 2.0 specification and above calls transmitters and receivers which can transmit and receive signals using either a Synchronous Code Division Multiple Access (SCDMA) mode; or an Advanced Time Division Multiplexing (ATDMA) mode.

For the purposes of this invention, often use of the SCDMA mode is preferable because this mode calls for accurate transmitter (e.g. cable modem transmitter) synchronization, and this in turn makes receiver implementation simpler for both aspects of the invention. That is SCDMA mode facilitates the adjacent channel crosstalk cancellation process, which is used in the first aspect of the invention. SCDMA mode also facilitates the fine combined QAM (quadrature amplitude modulation) constellation processing techniques, which are used in the second aspect of the invention. These fine combined QAM constellation processing techniques are discussed in more detail below.

In particular, with regards to the fine combined QAM constellation processing second aspect of the invention, SCDMA mode further allows for greater flexibility in defining the combined QAM constellation size per code and bit allocation among users, as will also be discussed in more detail below.

In some embodiments, this second aspect of the invention may be a method of further improving the upstream data transmission rate cable modems on a DOCSIS CATV cable system. Here as well, the invention will generally also provide an improved cable or head end DOCSIS receiver system. In this second embodiment, the improved cable or head end DOCSIS receiver system will be capable of frequency synchronizing and transmitter level adjusting a plurality of neighborhood DOCSIS cable modems, each with its own upstream DOCSIS transmitter. DOCSIS Carrier and Clock synchronization, as well as phase synchronization is also required.

Figure 9:
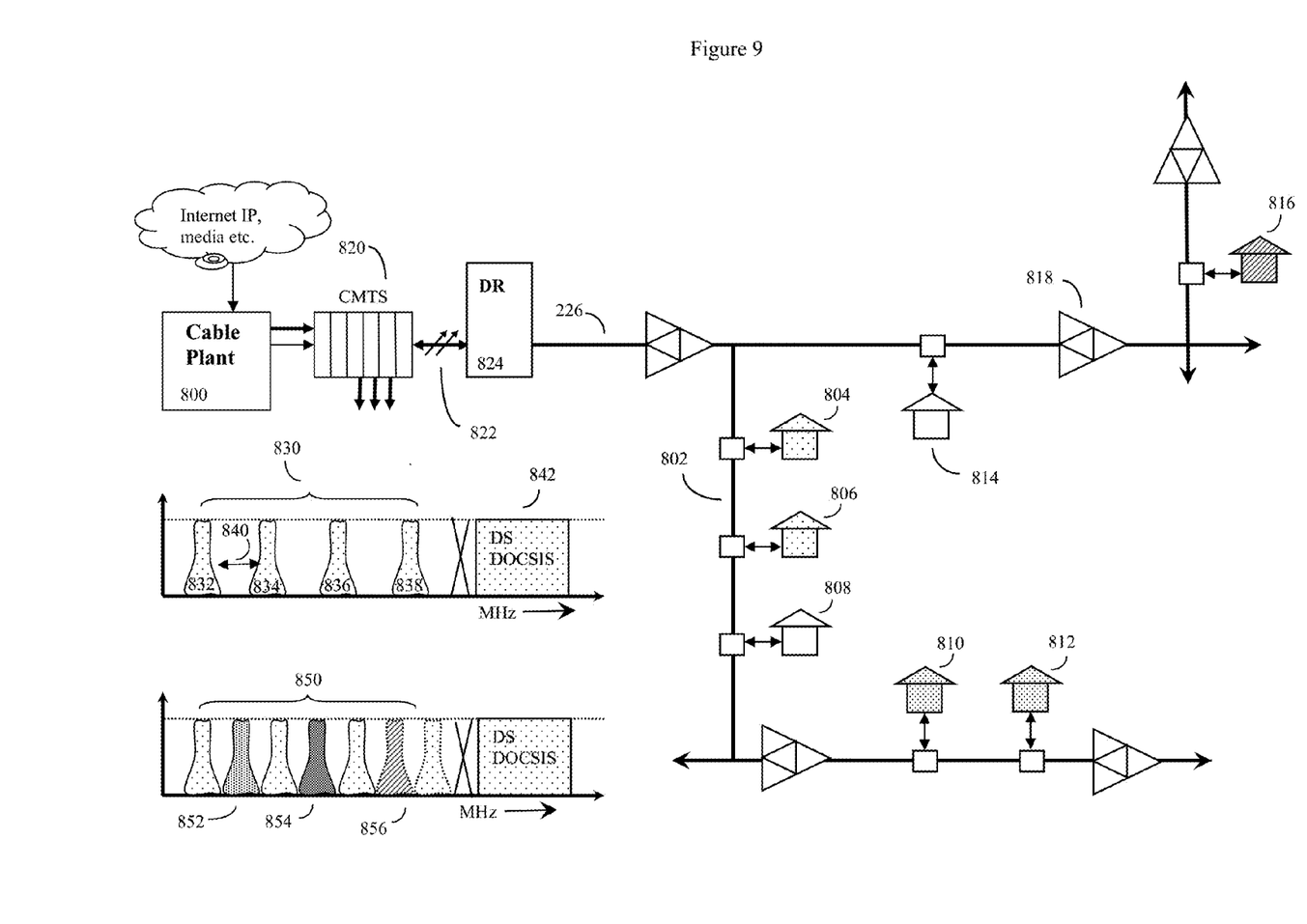
FIG. 9 shows a diagram of how the invention's techniques of crosstalk correction and using two cable modem QAM transmitters on one channel may be combined to improve the upstream data carrying capability of a CATV cable system.

As shown in more detail in FIG. 9, generally CATV cable systems comprise a plurality of cable modems (804-816), each attached to a neighborhood section of CATV cable (802), and each communicating to a cable head with DOCSIS receivers (800, 820), or an optical fiber junction (824) which in turn eventually communicates with DOCSIS receivers. For the purposes of discussion of this aspect of the invention, however, let us focus on just two of the many neighborhood cable modems, such as (804) and (806). In this case, assume that there are so many other neighborhood cable modems that the upstream channels are fully utilized, and thus it is advantageous to "overload" the prior DOCSIS system, which only allowed one cable modem transmitter to transmit at any given time and any given channel, by now allowing both a first cable modem and a second cable modem to transmit at the same given time, and same given channel.

To do this, according to the invention, the cable head (820) or other device (824) may, after appropriate carrier and clock synchronization, as well as phase synchronization, direct at least a first DOCSIS cable modem (804) to upstream transmit its first signals at a first range of signal intensity levels at a given time and given frequency. The invention will also direct at least a second DOCSIS cable modem (806) to transmit its second signals at a second range of signal intensity levels at the same time, same frequency, and same SCDMA code as the first DOCSIS cable modem. Thus the system's improved DOCSIS receivers will end up receiving a combined first and second DOCSIS cable modem signals (852). As will be discussed, however, by suitable selection of appropriate QAM transmission protocols, and using the invention's methods, it is feasible to use this improved DOCSIS receiver to separate the first signals from the second signals. The net effect is to essentially double upstream data carrying capacity because now two cable modems may upstream transmit at the same time and using the same communications channels.

To do this, in one embodiment, the invention may direct the first DOCSIS cable modem (804) to upstream transmit its first signals at a first range of signal intensity levels, and also direct the second DOCSIS cable modem (806_ to upstream transmit its second signals at a second range of signal intensity levels. This can be done, for example, by transmitting the appropriate DOCSIS commands, such as at least one DOCSIS Power Level Adjust or Transmit Equalization Set parameters to the first and second cable modems (804), (806). For example, the second range of signal intensity levels may be set to a value that is half that of the first range of signal intensity levels.

Generally, according to this method, the first DOCSIS cable modem (804) may be directed to upstream transmit using the same type of QAM protocol as the second DOCSIS cable modem (806). Alternatively, however asymmetric transmission methods may be also used, wherein the first DOCSIS cable modem may be directed to transmit using a type of QAM protocol that is different from the second DOCSIS cable modem.

Examples

As previously discussed, upstream DOCSIS generally uses sends data modulated according to an 8 (3 bits), 16 (4 bits), 32 (5 bits), or 64 (6 bits) level QAM data modulation method. However, because DOCSIS uses synchronized transmission methods, it is possible to essentially combine the relatively coarse (e.g. 4-bit QAM-16) transmissions from two different users using two different cable modems into a combined transmission that will essentially transmit more bits of data per symbol per time slice.

With this scheme, an improved DOCSIS receiver, which in some embodiments may be a standard DOCSIS QAM receiver with software improvements designed to separate the first cable modem transmitter from the second cable modem transmitter, can then be used to separate out the two signals from the two transmitters at the receiving end. Here this cable modem transmitter separation method can be relatively simple, such as, for example separating out the least significant bits of the QAM signal from the most significant bits of the QAM signal, optionally supplemented by additional algebraic or linear algebraic solution methods (e.g. for noise correction) as desired.

Figure 3:
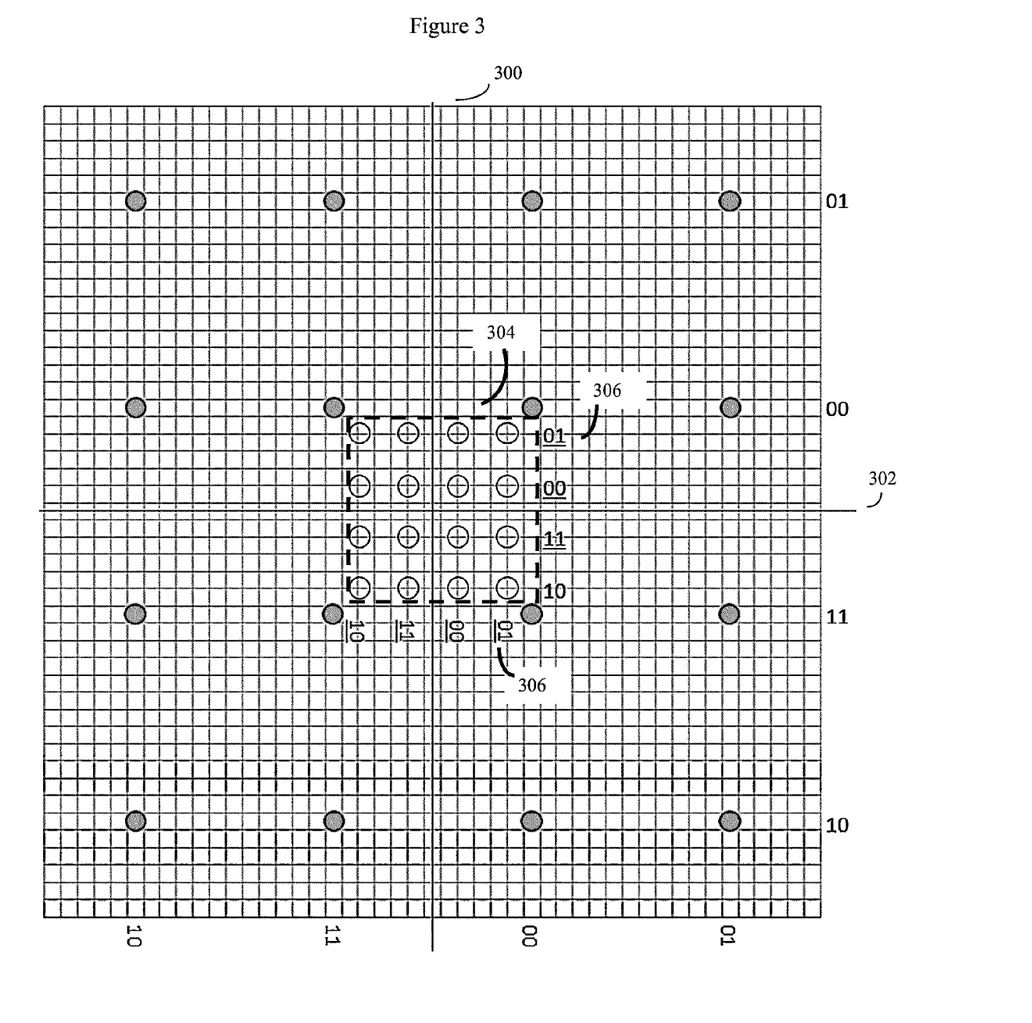
FIG. 3 shows an example of two users (two cable modem transmitters) transmitting upstream on the same channel and at the same time, one using a QAM16 transmission scheme at a first signal intensity, and the other using a QAM16 transmission scheme at a second and lower intensity level (symmetric scheme).

To do this, generally in addition to timing synchronization between the different cable modems, there must also be frequency synchronization and transmitter level (signal intensity) control as well. This method also assumes an adequate signal to noise level (SNR) at the receiver FIG. 3 shows an example of two users (two cable modem transmitters) transmitting upstream on the same channel and at the same time, one using a QAM-16 transmission scheme at a first signal intensity, and the other using a QAM-16 transmission scheme at a second and lower intensity level (symmetric scheme). The QAM constellation values of the second and lower intensity level transmitter are shown underlined.

Figure 4:
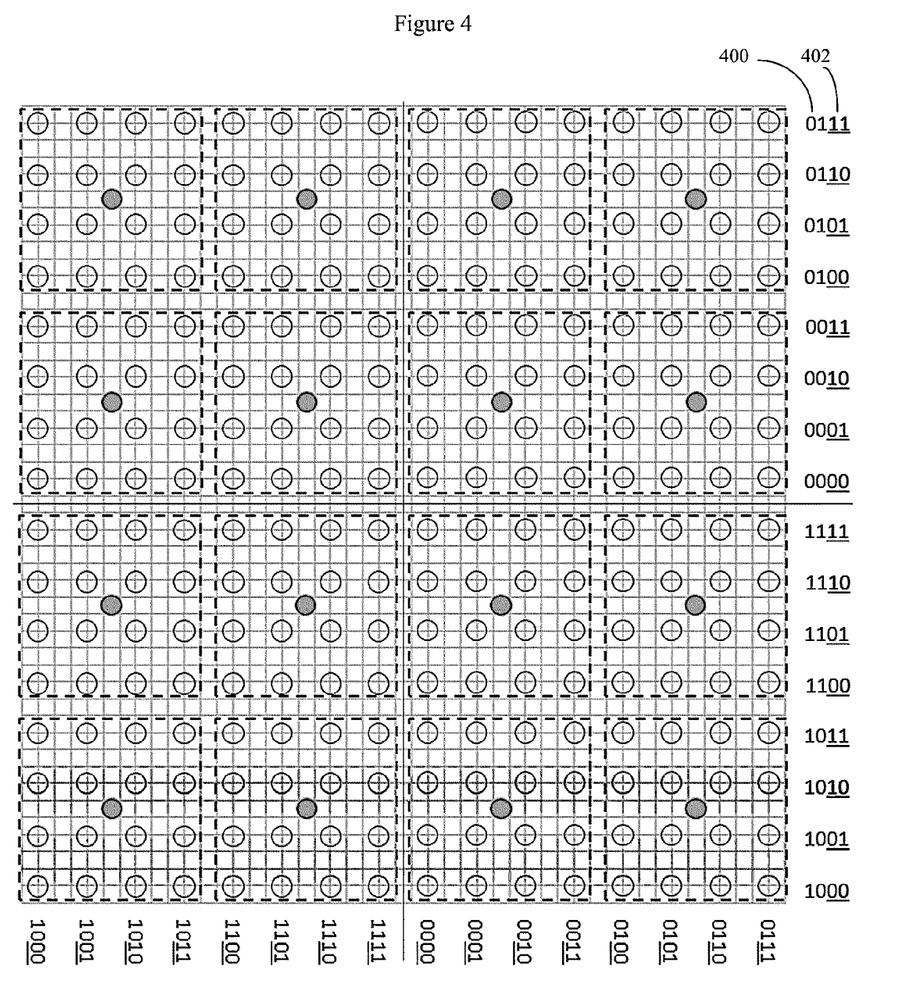
FIG. 4 shows an example of the how the DOCSIS receivers can receive the two combined high intensity and low intensity QAM-16 signals as a QAM-256 signal, and then determine which symbols came from which transmitter.

FIG. 4 shows an example of the how the DOCSIS receivers can receive the two combined high intensity and low intensity QAM-16 signals as a QAM-256 signal, and then determine which symbols came from which transmitter. Here the first and higher level transmitter shows up as the higher level bits of the combined QAM signal, while the second and lower level transmitter shows up as the lower level (underlined) bits of the combined QAM signal. Thus with appropriate software, the improved DOCSIS receiver can easily separate out the high order bits (400) from the low order bits (402) and determine the original signals from the two transmitters.

Turning briefly to FIG. 9, the results shown in FIG. 3 can, for example be obtained from two different cable modems (804) and (806) each transmitting a QAM-16 signal from two users (i.e. a first user and a second user) at the same time and same frequency. The resulting combined signal originally shown in FIG. 4, is seen by the cable head or plant receiver (824), (820).

Note that FIGS. 3-8 generally follow the conventional QAM constellation diagram convention, where the QAM "Q(t)" (Phase) signal is on the "Y" axis (300), and the QAM "I(t)" (Intensity) signal is on the "X" axis (302). The communication bits transmitted by the QAM constellation(s) are, in some figures, shown as the various shades of black and white inside the circles, which represent the various QAM constellation points. This QAM constellation scheme thus can distinguish between different QAM signals of different amplitude; this aspect is useful, because an improved QAM receiver following this type of QAM constellation scheme can therefore distinguish between two different simultaneous QAM transmitters, as will be discussed.

Thus, in FIG. 3, as previously discussed, one user and one cable modem will transmit at a higher (e.g. +1 and −1) level of signal intensity (the gray circles) while the other user and other cable modem will transmit a lesser intensity level, such as a ½ and −½ level of signal intensity (the white circles shown in dotted box 304). The signal intensity levels of the lower intensity transmitter are shown underlined on the "I" axis as (306), and on the "Q" axis as (308).

Note that this +1 and −1 example illustrates the case for a two level transmitter with symmetric bit per symbol allocation.

Note further that the particular transmit leveling scheme used in this aspect of the invention generally depends on both the respective bit per symbol allocation, and also path loss. The leveling algorithm will control each QAM transmitter to form the final desired QAM constellation which maximizes the bits per symbol, subject to available SNR to decode the bits.

In an alternative "symmetric" scheme (i.e. each user and cable modem is transmitting using the same type of QAM protocol), a first user could transmit at 4 bits per symbol with grid points +/−4, 12; and the second user could transmit at 4 bits per symbol with grid points +/−1, 3. In this case, the two signals together again generate an 8-bit like QAM-256 like signal with a relative transmit symbol spacing of 4:1.

Put alternatively, QAM-16 sends 4 bits per symbol. Here, the 4 bits from the first cable modem QAM transmitter and the 4 bits from the second cable modem QAM transmitter combine to produce a (2[transmitter 1]+2[transmitter 2]) bit combination on the QAM "I" axis, and a (2[transmitter 1]+2 [transmitter 2]) bit combination on the QAM "Q" axis. Due to the differing signal intensity levels, the QAM signals from the two channels can be solved for (e.g. determined) by improved software operating at the invention's improved QAM receiver (s).

Figure 5:
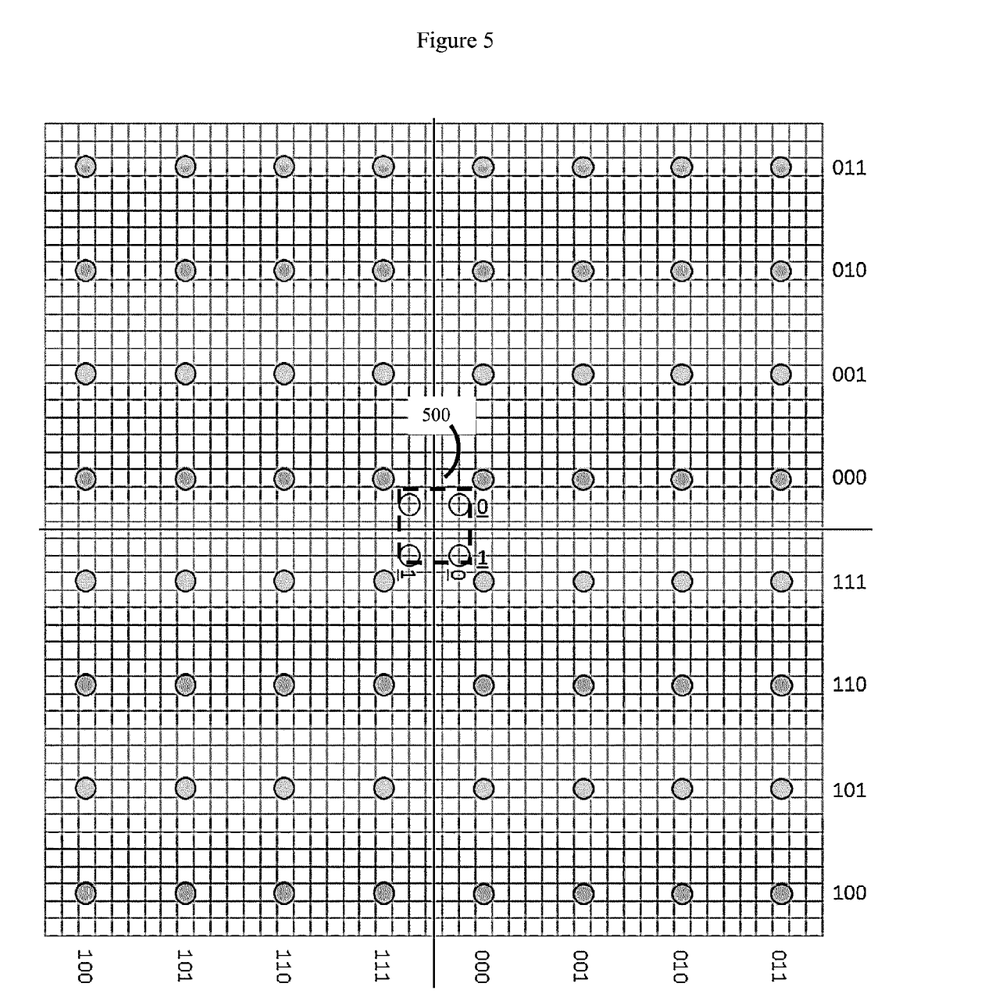
FIG. 5 shows an example where the first user is transmitting using a high intensity QAM-64 signal, and the other user is transmitting using a low intensity QAM-4 signal (asymmetric example).

By contrast, FIG. 5 shows a QAM constellation diagram of an asymmetric example. Here the first user is transmitting using a higher intensity QAM-64 signal (gray circles), while the second user is transmitting using a lower intensity QAM-4 signal (white circles, box 500). The lower intensity signals are again shown underlined. The two signals together are received by the DOCSIS receiver as the combined QAM-256 signal shown in FIG. 6. The DOCSIS receiver can again determine which symbols came from which transmitter by, for example, separating out the high order bits (not underlined) from the low order bits (underlined).

Figure 6:
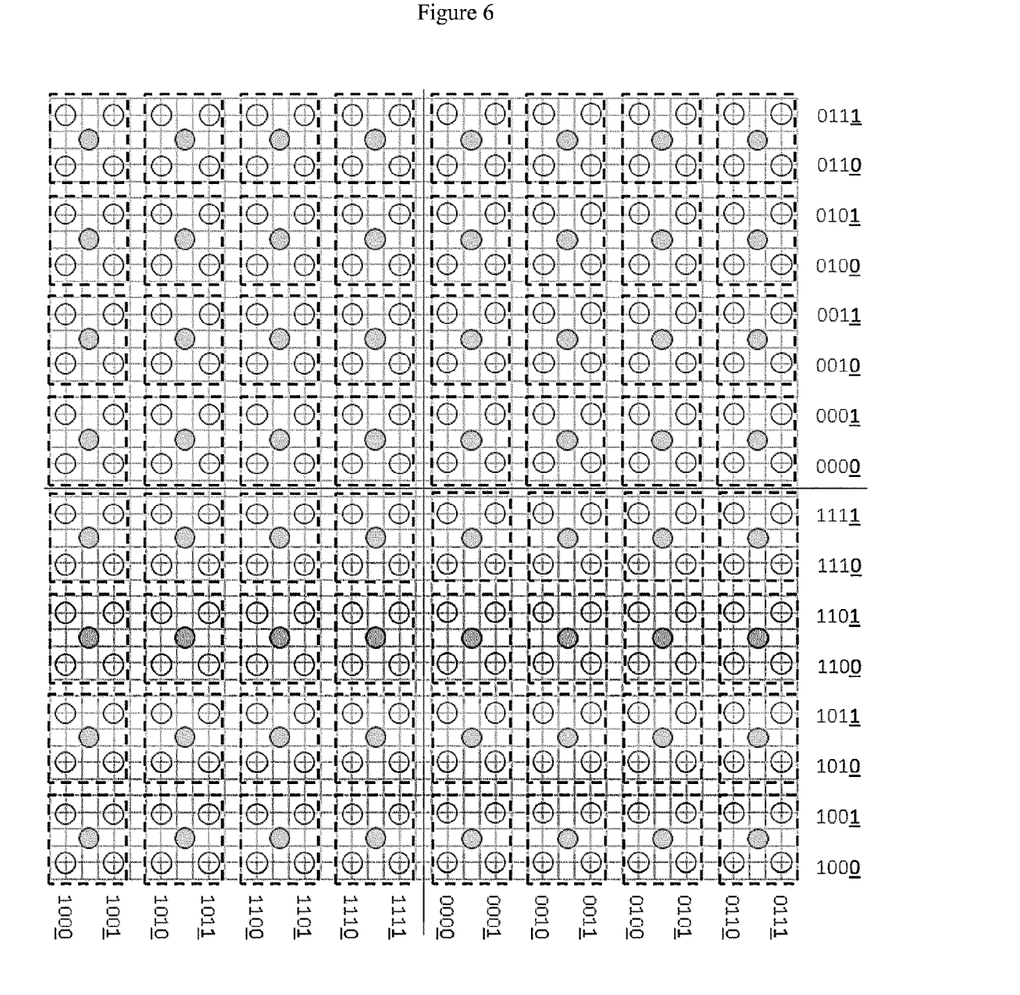
FIG. 6 shows how the DOCSIS receivers can receive the combined high intensity QAM-64 and low intensity QAM-4 signals and again determine which symbols came from which transmitter.

Here, QAM-64 transmits 6 bits per symbol, and QAM-4 transmits 2 bits per symbol. Here, the 6 bits from the first cable modem QAM transmitter and the 2 bits from the second cable modem QAM transmitter combine to produce a (3[transmitter 1]+1[transmitter 2]) bit combination on the QAM "I" axis, and a (3[transmitter 1]+1[transmitter 2]) bit combination on the QAM "Q" axis. Here as well, due to the differing signal intensity levels, the QAM signals from the two channels can be solved for (e.g. determined) by such high/low-order bit-separating (e.g. improved) software operating at the invention's improved QAM receiver(s).

Figure 7:
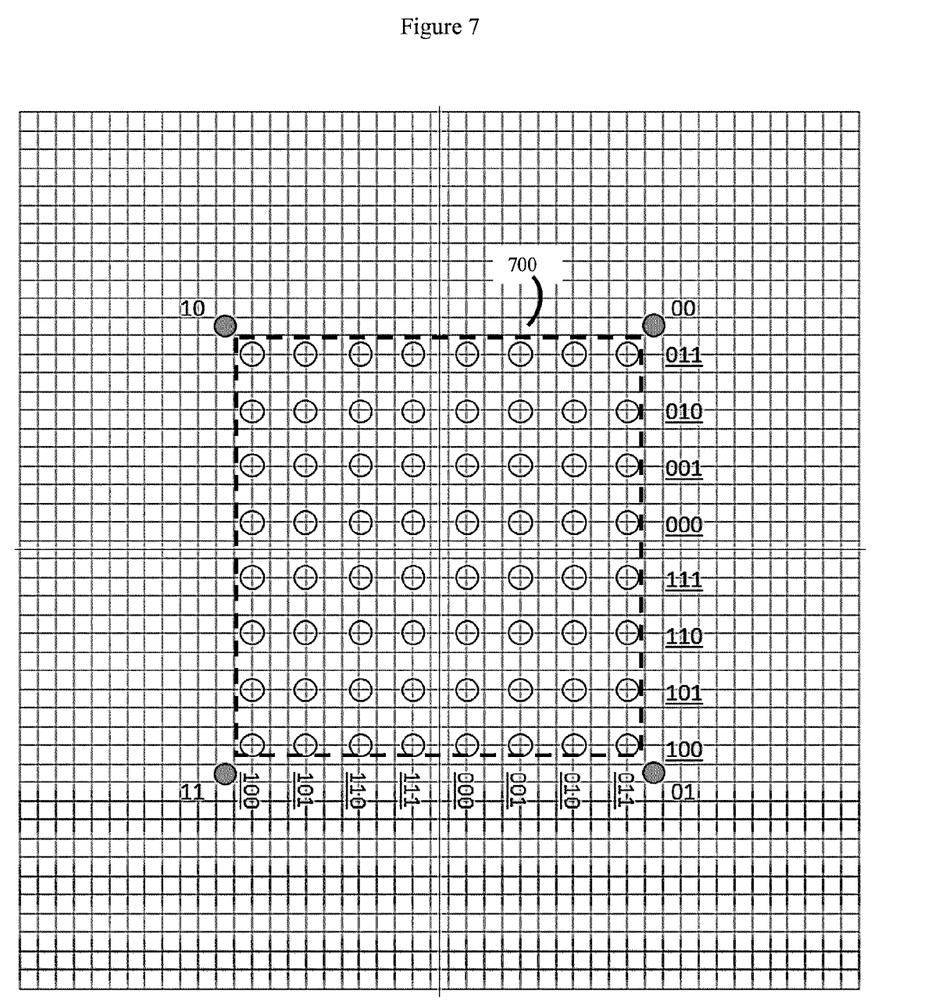
FIG. 7 shows another asymmetric example where the first user is transmitting a high intensity QAM-4 signal, and the other user is transmitting using a low intensity QAM-64 signal.

In another "asymmetric" example, the two simultaneous users may be transmitting on two different cable modems by different QAM modulation methods. For example, the first user may be transmitting at 2 bits per symbol using higher intensity QAM-4 modulation, (e.g. using +1, −1 signal levels), while the second user may be transmitting at 6 bits per symbol using QAM-64 modulation and lower intensity modulation (e.g. +½ and −½ signal levels). This alternative example is shown in FIG. 7. Here, the first user is transmitting a high intensity QAM-4 signal (gray circles), and the other user is transmitting using a low intensity QAM-64 signal (white circles, box 700). Here again the lower intensity signals from the low intensity transmitter are shown underlined.

Figure 8:
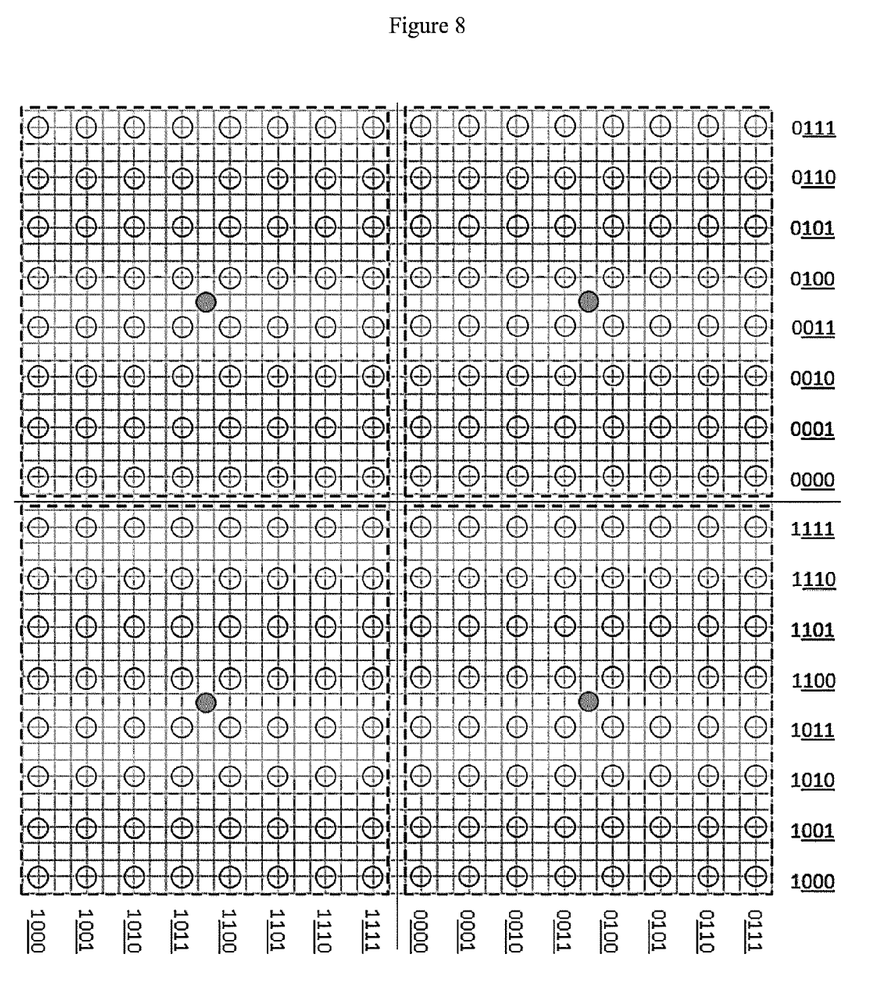
FIG. 8 shows how the DOCSIS receivers can receive the combined high intensity QAM-4 signal and the low intensity QAM-64 signal and again determine which symbols came from which transmitter.

FIG. 8 shows how the DOCSIS receivers can receive the combined high intensity QAM-4 signals and the low intensity QAM-64 signals, separate out the bits according to high order bits and low order bits, and again determine which symbols came from which transmitter.

Here, QAM-4 transmits 2 bits per symbol, and QAM-64 transmits 6 bits per symbol. Once again, the 2 bits from the first cable modem QAM transmitter and the 6 bits from the second cable modem QAM transmitter combine to produce a (1[transmitter 1]+3[transmitter 2]) bit combination on the QAM "I" axis, and a (1[transmitter 1]+3[transmitter 2]) bit combination on the QAM "Q" axis. Once again, due to the differing signal intensity levels (except here 4-bit transmitter 1 signal is at the higher power), the QAM signals from the two channels can be solved for (e.g. determined) by high/low-order bit-separating (e.g. improved) software operating at the invention's improved QAM receiver(s).

FIG. 9 shows a diagram of how the invention's techniques of crosstalk correction and using two cable modem QAM transmitters on one channel may be combined to improve the upstream data carrying capability of a CATV cable system.

In this scheme, as previously discussed, CATV data is being transmitted from cable plant or head (800) to various local neighborhood CATV cables (802) and households with cable modems (804)-(816). Some portions of the neighborhood CATV cable may contain RF amplifiers (818). The head end of the CATV system may additionally use Cable Modem Termination Systems (CMTS) (820) to manage the system, and may transmit over optical fiber (822) to various DOCSIS receivers which may, for example, be located in optical fiber nodes (824).

Under the prior art DOCSIS scheme (830), the cable modems in the seven households (804)-(816) might, for example, be forced to transmit upstream data, on a one channel per modem per time basis, on various upstream channels (832), (834), (836), (838) separated by comparatively wide guard bands (840). The comparatively larger amount of CATV spectrum allocated to CATV downstream data channels is shown as (842). As is symbolized by mismatch between the seven cable modems and the four upstream data channels, there can be an upstream data bottleneck.

By contrast, according to the invention, this upstream bottleneck can be reduced by using an improved DOCSIS receiver (824) capable of reducing crosstalk and/or capable of distinguishing between two different cable modem transmitters transmitting at the same time, same frequency, and same SCDMA code. Here, for example, node (822) or CMTS (820) may broadcast a command, such as various MAC level offset frequency adjust parameter commands, to cable modems (804)-(816) instructing them to now transmit on alternate more closely spaced DOCSIS upstream channels (850). Because the guard bands are reduced or absent, now more upstream DOCSIS channels are possible (here 6 channels, rather than the previous 4 channels).

Additionally, for sill higher upstream transmission efficiency, the CMTS (820) or node (824) may additionally transmit other DOCSIS MAC cable modem commands, such as a command to cable modems (804) and (806) to transmit on the same channel and at the same time and SCSMA code, but where cable modem (806) is now transmitting at half power levels. This 2× loaded DOCSIS upstream channel can be seen as channel (852). The system may similarly instruct cable modems (810) and (812) to do the same thing, producing two transmitters per channel loaded DOCSIS upstream channels (854). Cable modem (816) may also now be instructed to transmit on a new DOCSIS upstream channel (856) which is now made possible due to the increased upstream spectrum that was made available as a result of the reduction of the guard bands (840).

The invention claimed is:

1. A method of improving the upstream data transmission rate of a DOCSIS (Data Over Cable Service Interface Specification) CATV cable system comprising a plurality of cable modems and a DOCSIS receiver, said method comprising:
   directing a first cable modem to transmit upstream to the DOCSIS receiver using a first channel at a first frequency; and
   directing a second cable modem to transmit upstream to the DOCSIS receiver using a second channel at a second frequency that is separated from the first frequency by a guard band bandwidth of less than or equal to one half $\alpha*Fs$, where Fs is the bandwidth of each said channels, and $\alpha$ is the roll-off factor of the bandwidth of each of said channels,
   wherein DOCSIS receiver corrects cross-talk between the first channel and the second channel.

2. The method of claim 1, wherein N cable modems transmit N adjacent channel frequencies, and wherein the bandwidth occupied by said N adjacent channels, including the roll off at the two extreme boundaries of said N adjacent channels is $(N+\alpha)*Fs$, where Fs is the bandwidth of each of said channels, and $\alpha$ is the roll-off factor of the bandwidth of the two channels at the two extreme boundaries of said N adjacent channels.

3. The method of claim 1, wherein said DOCSIS receiver corrects for cross-talk between adjacent DOCSIS channels using adaptive signal separation or signal equalization methods.

4. The method of claim 3, wherein said DOCSIS receiver operates by partitioning the adjacent DOCSIS channel signals through a polyphase filter bank, and further processing the output from said polyphase filter bank using Fast Fourier Transform methods.

5. The method of claim 4, wherein said polyphase filter bank partitioning and said Fast Fourier Transform methods are implemented using at least one Digital Signal Processor.

6. The method of claim 1 further comprises directing said plurality of cable modems to transmit upstream using a plurality of channel frequencies selected with reduced or absent guard bands by transmitting a plurality of DOCSIS Offset Frequency Adjust parameters to said plurality of cable modems.

7. A method for improving upstream data transmission rate of a (Data Over Cable Service Interface Specification) DOCSIS CATV cable system, the method comprising:
   directing at least a first DOCSIS cable modem to upstream transmit its first signals using a particular Synchronous Code Division Multiple Access (SCDMA) code at a first range of signal intensity levels at a given time and a given frequency;

directing at least a second DOCSIS cable modem to transmit its second signals using the same particular SCDMA code at a second range of signal intensity levels at the same given time and same given frequency;

receiving combined first and second DOCSIS cable modem signals; and separating said first signals and said second signals from the received combined first and second DOCSIS cable modem signals.

8. The method of claim 7, wherein directing said first DOCSIS cable modem to upstream transmit its first signals at a first range of signal intensity levels and directing said second DOCSIS cable modem to upstream transmit its second signals at a second range of signal intensity levels is done by carrier, clock, and phase synchronizing said first and second cable modems, and transmitting at least one DOCSIS Power Level Adjust or Transmit Equalization Set parameters to said first and second cable modems.

9. The method of claim 7, wherein said second range of signal intensity levels has a value that is half that of said first range of signal intensity levels.

10. The method of claim 7, wherein said first DOCSIS cable modem transmits using the same type of QAM protocol as said second DOCSIS cable modem.

11. The method of claim 7, wherein said receiving and separating is performed by a DOCSIS receiver system that is capable of frequency synchronizing and transmitter level adjusting a plurality DOCSIS cable modems.

12. A DOCSIS (Data Over Cable Service Interface Specification) CATV cable system with improved upstream data transmission rate, said system comprising:

a plurality DOCSIS cable modems that are configured to transmit upstream using a plurality of channel frequencies, wherein each adjacent pair of the channel frequencies are separated by a guard band bandwidth of less than or equal to one half $\alpha*Fs$, where Fs is the bandwidth of each said channels, and $\alpha$ is the roll-off factor of the bandwidth of each of said channels;

a DOCSIS receiver for receiving said plurality of adjacent channel frequencies and for correcting cross-talk between said adjacent pairs of DOCSIS channels.

13. The system of claim 12, wherein N DOCSIS cable modems transmit N adjacent channel frequencies, and wherein the bandwidth occupied by said N adjacent channels, including the roll off at the two extreme boundaries of said N adjacent channels is $(N+\alpha)*Fs$, where Fs is the bandwidth of each of said channels, and $\alpha$ is the roll-off factor of the bandwidth of the two channels at the two extreme boundaries of said N adjacent channels.

14. The system of claim 12, wherein said DOCSIS receiver corrects for cross-talk between adjacent DOCSIS channels using adaptive signal separation or signal equalization methods.

15. The system of claim 14, wherein said DOCSIS receiver operates by partitioning the adjacent DOCSIS channel signals through a polyphase filter bank, and further processing the output from said polyphase filter bank using Fast Fourier Transform methods.

16. The system of claim 15, wherein said polyphase filter bank partitioning and said Fast Fourier Transform methods are implemented using at least one Digital Signal Processor.

17. The system of claim 12, wherein said plurality of DOCSIS cable modems are configured to transmit upstream using the plurality of channel frequencies selected with reduced or absent guard bands by receiving a plurality of DOCSIS Offset Frequency Adjust parameters.

* * * * *